US012163853B2

(12) United States Patent
Wiri et al.

(10) Patent No.: US 12,163,853 B2
(45) Date of Patent: Dec. 10, 2024

(54) IDENTIFYING FALSE POSITIVE DATA WITHIN A SET OF BLAST EXPOSURE DATA

(71) Applicant: Applied Research Associates, Inc., Albuquerque, NM (US)

(72) Inventors: Suthee Wiri, Albuquerque, NM (US); David J. Ortley, Albuquerque, NM (US)

(73) Assignee: Applied Research Associates, Inc., Albuquerque, NM (US)

(*) Notice: Subject to any disclaimer, the term of this patent is extended or adjusted under 35 U.S.C. 154(b) by 0 days.

(21) Appl. No.: 18/149,124

(22) Filed: Jan. 2, 2023

(65) Prior Publication Data

US 2023/0144611 A1  May 11, 2023

Related U.S. Application Data

(63) Continuation of application No. 17/093,107, filed on Nov. 9, 2020, now Pat. No. 11,543,316.

(51) Int. Cl.
*G06F 7/00* (2006.01)
*A42B 3/04* (2006.01)
*G01L 5/14* (2006.01)
*G06F 16/9035* (2019.01)
*G06F 18/2113* (2023.01)
*G06N 20/00* (2019.01)

(52) U.S. Cl.
CPC ............... *G01L 5/14* (2013.01); *A42B 3/046* (2013.01); *G06F 16/9035* (2019.01); *G06F 18/2113* (2023.01); *G06N 20/00* (2019.01)

(58) Field of Classification Search
CPC .... G01L 5/14; G06F 16/9035; G06F 18/2113; G06N 20/00; A42B 3/046
USPC .................................. 707/600–899; 73/35.14
See application file for complete search history.

(56) References Cited

U.S. PATENT DOCUMENTS

| | | | |
|---|---|---|---|
| 6,178,141 B1 | 1/2001 | Duckworth et al. | |
| 11,543,316 B2 | 1/2023 | Wiri et al. | |
| 12,000,747 B2 | 6/2024 | Willens et al. | |
| 2002/0003470 A1 | 1/2002 | Auerbach | |

(Continued)

FOREIGN PATENT DOCUMENTS

| | | |
|---|---|---|
| CN | 111024011 A | 4/2020 |
| JP | 20200064883 | 4/2020 |

(Continued)

OTHER PUBLICATIONS

PCT Patent Application PCT/US2021/058000 International Preliminary Report on Patentability issued May 8, 2023.

(Continued)

*Primary Examiner* — Isaac M Woo
(74) *Attorney, Agent, or Firm* — Erise IP, P.A.

(57) ABSTRACT

A method, system, and computer-readable media for identifying false positive data within a set of blast exposure data. After debiasing and filtering the blast exposure data, an algorithm identifies predetermined features within the data that may be indicative of false positive data. The predetermined features are used to calculate a false positive score and if the false positive score exceeds a predetermined score threshold, the data is flagged with a false positive flag and may be removed from the set of blast exposure data.

20 Claims, 4 Drawing Sheets

(56) References Cited

U.S. PATENT DOCUMENTS

| | | | |
|---|---|---|---|
| 2010/0005571 | A1 | 1/2010 | Moss et al. |
| 2012/0170412 | A1 | 7/2012 | Calhoun et al. |
| 2015/0051847 | A1 | 2/2015 | Angello et al. |
| 2015/0143875 | A1 | 5/2015 | Wong et al. |
| 2016/0267763 | A1 | 9/2016 | Allen et al. |
| 2017/0367627 | A1* | 12/2017 | Brister ............... A61B 5/1468 |
| 2022/0214124 | A1 | 7/2022 | Leonhardt et al. |
| 2022/0317145 | A1 | 10/2022 | Bartsch |
| 2023/0080071 | A1 | 3/2023 | Allen et al. |
| 2023/0144611 | A1 | 5/2023 | Wiri et al. |
| 2023/0408325 | A1 | 12/2023 | Wiri et al. |

FOREIGN PATENT DOCUMENTS

| | | | |
|---|---|---|---|
| KR | 1020110040648 | A | 4/2011 |
| WO | 2017011811 | A1 | 1/2017 |
| WO | 2018093444 | A1 | 5/2018 |

OTHER PUBLICATIONS

PCT Patent Application PCT/US2023/014258 International Search Report and Written Opinion of the International Searching Authority issued Jun. 19, 2023.

PCT Patent Application PCT/US2023/023380 International Search Report and Written Opinion of the International Searching Authority issued Sep. 7, 2023.

U.S. Appl. No. 17/826,631 Non-Final Office Action issued Feb. 29, 2024.

U.S. Appl. No. 18/317,669 Non-Final Office Action issued Mar. 21, 2024.

U.S. Appl. No. 17/826,631 Ex Parte Quayle Action issued Aug. 16, 2024.

U.S. Appl. No. 18/317,669 Notice of Allowance issued Aug. 7, 2024.

PCT Patent Application PCT/US2024/27228 International Search Report and Written Opinion of the International Searching Authority issued Aug. 20, 2024.

European Patent Application 21890036.3, Extended Search Report, issued Sep. 9, 2024.

Peter Prince et al: "Deploying Acoustic Detection Algorithms on LowCost, Open-Source Acoustic Sensors for Environmental Monitoring", Sensors, vol. 19, No. 3, Jan. 29, 2019 (Jan. 29, 2019), p. 553, XP055685440, DOI: 10.3390/s19030553.

U.S. Appl. No. 17/826,631 Notice of Allowance issued Oct. 8, 2024.

* cited by examiner

IDENTIFYING FALSE POSITIVE DATA WITHIN A SET OF BLAST EXPOSURE DATA

CROSS-REFERENCE TO RELATED APPLICATIONS

This patent application is a continuation application claiming priority benefit, with regard to all common subject matter, of U.S. patent application Ser. No. 17/093,107, filed Nov. 9, 2020, and entitled "IDENTIFYING FALSE POSITIVE DATA WITHIN A SET OF BLAST EXPOSURE DATA." The above-referenced application is hereby incorporated by reference in its entirety into the present application.

BACKGROUND

1. Field

Embodiments of the invention relate to analyzing blast exposure data. More specifically, embodiments of the invention relate to identifying and removing false positive data from blast exposure data.

2. Related Art

Body mounted blast sensors are used to record blast exposure data experienced by a subject. The blast exposure data is analyzed and may be used to calculate an incident pressure associated with a blast exposure. However, in some instances, the blast exposure data contains false positive data which is inaccurate or not associated with a real blast exposure. Unless identified, this false positive data may be placed into a medical record of the subject and may therefore lead to misdiagnosis of the subject. Accordingly, it is desirable to remove false positive data from blast exposure data to ensure that the blast exposure data is truly and accurately representative of a blast exposure.

Typically, blast data analysis is performed by hand from a trained professional, such as a blast engineer or blast expert, who looks over the blast exposure data and identifies and removes false positive data. This process is cumbersome and time-consuming and relies on a relatively small group of trained professionals. Accordingly, manual techniques of identifying false positive data in blast exposure data are not scalable to a large volume of blast data records. Therefore, what is needed is an automated approach to identify and remove false positive data from a set of blast exposure data.

SUMMARY

Embodiments of the invention solve the above-mentioned problems by providing a method, system, and computer-readable media to identify false positive data from a set of blast exposure data. In some embodiments, the method includes a step of identifying features within the set of data that are associated with false positive classes to determine a false positive score. Then, if the false positive score exceeds a threshold the data is rejected and if the false positive score is not exceeded the data is accepted. As such, a trained professional is not required to identify false positive data within the set of blast exposure data.

A first embodiment of the invention is directed to a method for identifying false positive data from a set of blast exposure data, the method comprising the steps of: receiving the set of blast exposure data comprising raw pressure data over time; determining a bias associated with the raw pressure data; debiasing the raw pressure data according to the determined bias to produce debiased pressure data; filtering the debiased pressure data to produce filtered pressure data; integrating the debiased pressure data over time to produce impulse data; integrating the filtered pressure data over time to produce filtered impulse data; identifying one or more predefined features within any of the raw pressure data, the debiased pressure data, the impulse data, the filtered pressure data, and the filtered impulse data, wherein the one or more predefined features are associated with at least one of a plurality of predefined false positive classes; determining a false positive score associated with the set of blast exposure data based on the one or more identified features; and if the false positive score exceeds a predetermined threshold value, flagging the set of blast exposure data with a false positive flag.

A second embodiment of the invention is directed to one or more non-transitory computer-readable media storing computer-executable instructions that, when executed by a processor, perform a method for identifying false positive data from a set of blast exposure data, the method comprising the steps of: receiving the set of blast exposure data comprising raw pressure data over time; determining a bias associated with the raw pressure data; debiasing the raw pressure data according to the determined bias to produce debiased pressure data; filtering the debiased pressure data to produce filtered pressure data; integrating the debiased pressure data over time to produce pressure change data; integrating the filtered pressure data over time to produce filtered pressure change data; identifying one or more predefined features within any of the raw pressure data, the debiased pressure data, the pressure change data, the filtered pressure data, and the filtered pressure change data, wherein the one or more predefined features are associated with at least one of a plurality of predefined false positive classes; determining a false positive score associated with the set of blast exposure data based on the one or more identified features; and if the false positive score exceeds a predetermined threshold value, flagging the set of blast exposure data.

A third embodiment of the invention is directed to a system for identifying false positive data from a set of blast exposure data, the system comprising: a data source; and a processor programmed to perform a method for identifying false positive data from a set of blast exposure data, the method comprising the steps of: receiving the set of blast exposure data comprising raw pressure data over time from the data source; determining a bias associated with the raw pressure data; debiasing the raw pressure data according to the determined bias to produce debiased pressure data; filtering the debiased pressure data to produce filtered pressure data; integrating the debiased pressure data over time to produce impulse data; integrating the filtered pressure data over time to produce filtered impulse data; identifying one or more predefined features within any of the raw pressure data, the debiased pressure data, the impulse data, the filtered pressure data, and the filtered impulse data, wherein the one or more predefined features are associated with at least one of a plurality of predefined false positive classes; determining a false positive score associated with the set of blast exposure data based on the one or more identified features; and if the false positive score exceeds a predetermined threshold value, flagging the set of blast exposure data.

Additional embodiments of the invention are directed a human-generated feature detection algorithm, and a machine learning algorithm for identifying features within a set of blast exposure data and flagging false positive data.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
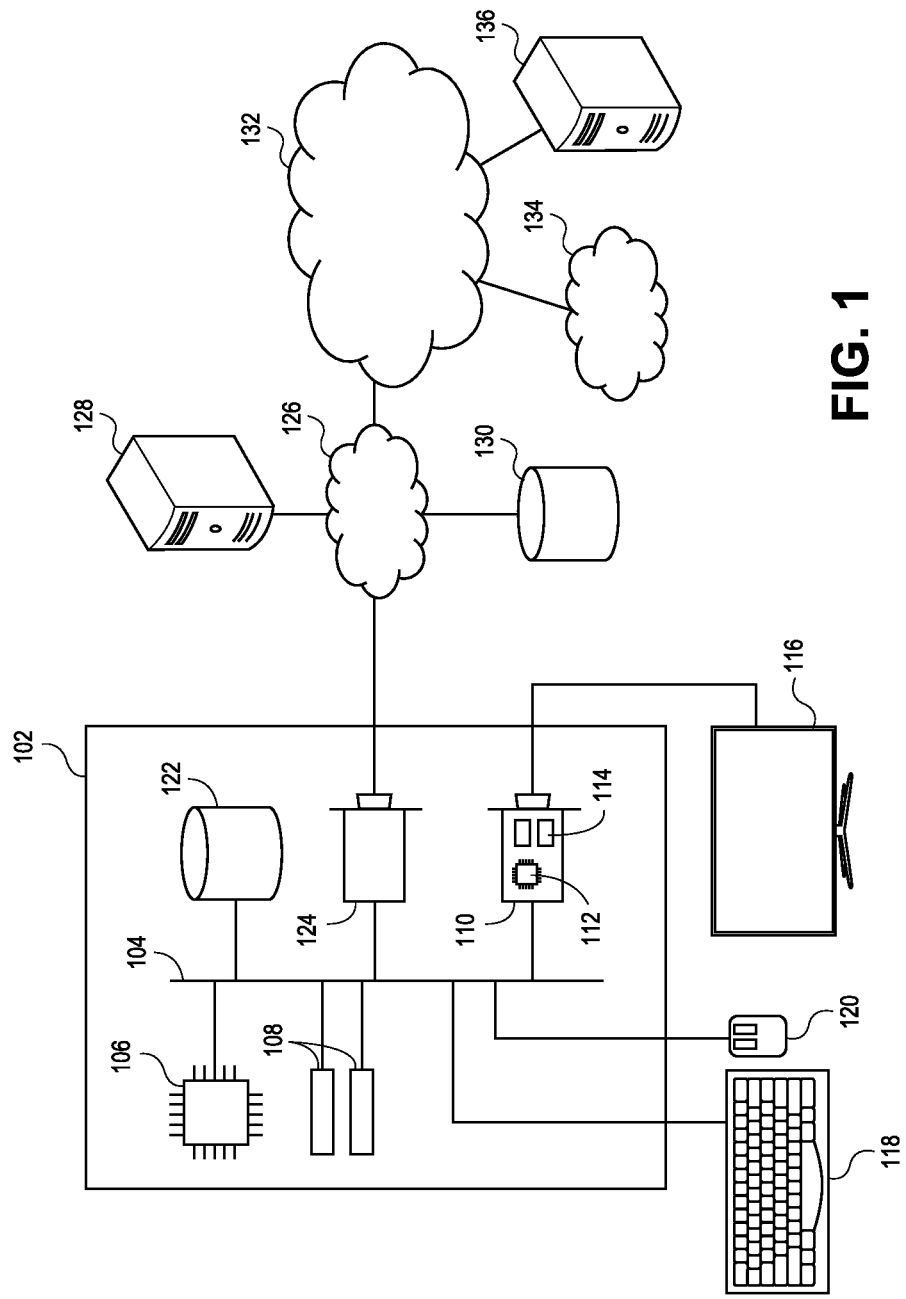
FIG. 1 shows an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
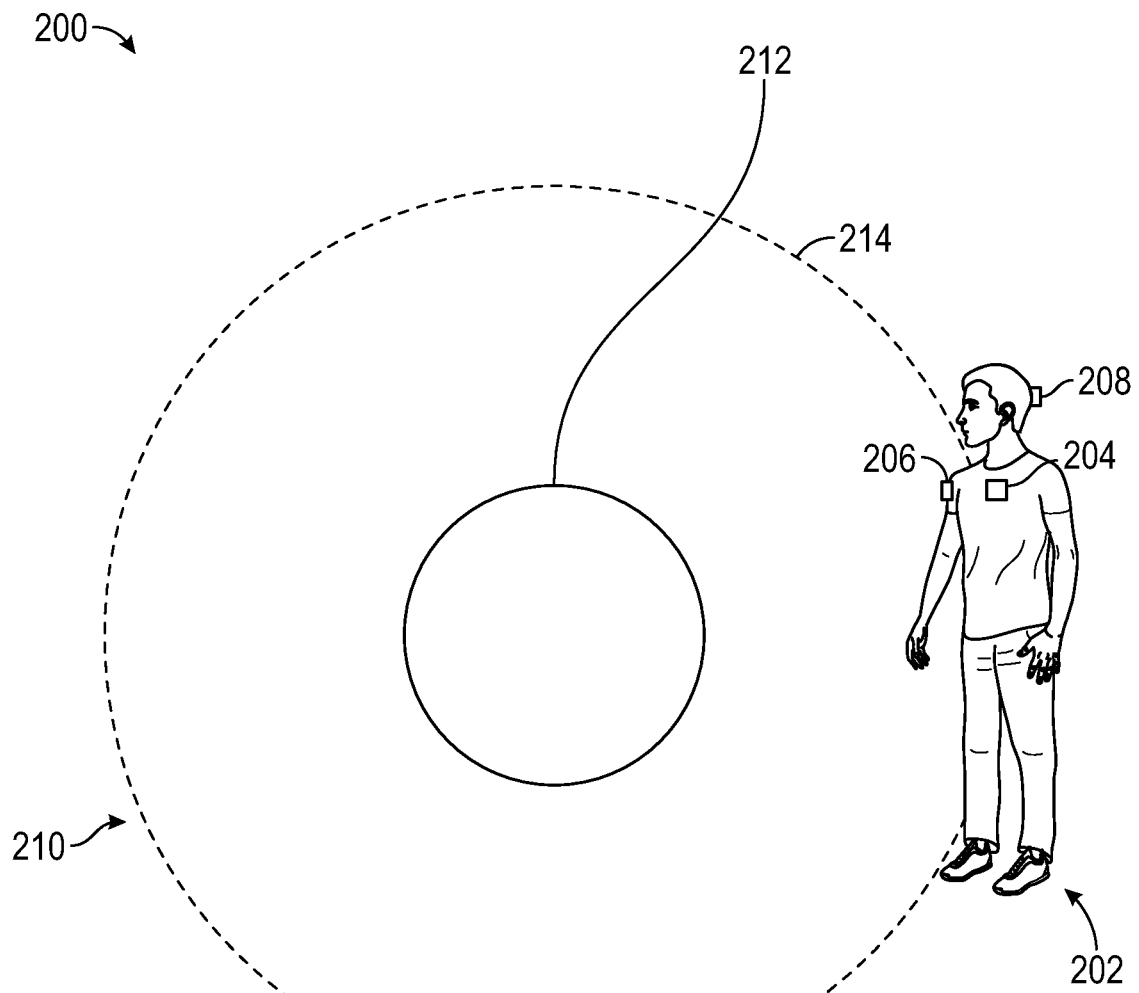
FIG. 2 shows an exemplary sensor environment for some embodiments of the invention.

Turning now to FIG. 2, an exemplary sensor environment for some embodiments is depicted and referred to generally by reference numeral 200. In such embodiments, subject 202 may be present. The subject 202, in some embodiments, may be a military service member, a police officer, or a public service personnel. Though it should be understood that the subject 202 may be any suitable personnel for which blast exposure data is recorded. The subject 202 is fitted with one or more body-mounted blast sensors for recording blast exposure data associated with a blast experienced by the subject 202. The blast may be for example, an explosive blast associated with an explosive breaching operation, improvised explosive device attack, or operation of an overpressure causing weapon system. Broadly and without limitation, the blast may be caused by any type of detonation or deflagration, such as a bomb, missile, or artillery shell.

In some embodiments, the one or more body-mounted blast sensors comprises a middle chest sensor 204 disposed on a chest of the subject 202, a dominant shoulder sensor 206 disposed on a dominant shoulder of the subject 202, and a back-of-head sensor 208 disposed on a back of the subject's head, such as on a helmet of the subject 202, as shown. Each of the plurality of body-mounted blast sensors may be operable to record pressure data associated with exposure to a blast. In some embodiments, it may be desirable to employ a plurality of body-mounted blast sensors to record blast exposure data at various positions and various orientations of the subject 202.

It should be understood that the body-mounted blast sensors 204, 206, and 208 are not limited to the mounting positions described above and may be placed elsewhere on the subject. Further, in some embodiments, more or fewer blast sensors may be included with the blast sensors shown in FIG. 2.

Alternatively, it should be understood that, in some embodiments, the plurality of blast sensors may be disposed elsewhere, such as, on a wall, on an inanimate object, or on robotic equipment, such as a drone. Here, the blast sensors are not body-mounted blast sensors attached to the subject 202. Such non-body-mounted blast sensors may be desirable to record blast exposure data during testing while avoiding human exposure to explosive blasts.

In some embodiments, a blast 210 may occur within the vicinity of the subject comprising an explosion 212 and a blast wave 214 extending radially outward from the center of the explosion 212. In some circumstances, the subject 202 may not experience the explosion 212 but may be affected by the blast wave 214, which covers a greater radius than the explosion 212. The blast wave 214 may not be visible to the subject 202 but still exerts a pressure on the subject 202, which may be sensed by the plurality of body-mounted sensors on the subject 202, such as sensors 204, 206, and 208. The blast 210 may be the result of the subject 202 firing a weapon or detonating an explosive. Alternatively, the blast 210 may be associated with another entity firing a weapon or detonating an explosive in the vicinity of the subject 202.

Figure 3:
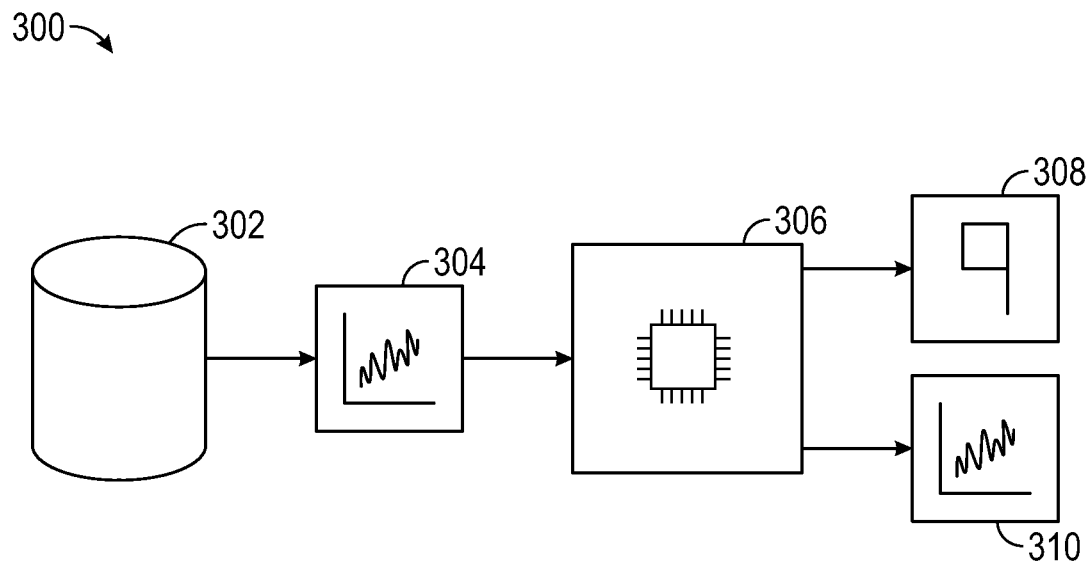
FIG. 3 shows a system diagram relating to some embodiments of the invention.

Turning now to FIG. 3, a system diagram is depicted relating to some embodiments and referred to generally by reference numeral 300. The system 300 comprises a data source 302 for providing a set of blast exposure data 304 to the processor 306. In some embodiments, the data source 302 may be at least one of the sensors 204, 206, and 208 from FIG. 2. Alternatively, in some embodiments, the data source 302 may be a separate data store storing blast exposure data from various other sources. Further still, the data source 302 may be a historic data store storing historic blast exposure data. In some embodiments, the set of blast exposure data 304 comprises raw pressure data recorded from a single blast sensor, such as any one of blast sensors 204, 206, and 208. Further, in some embodiments, the set of blast exposure data 304 comprises raw pressure data from a plurality of blast sensors. Said raw pressure data may be provided over time in the form of a pressure-time array.

In some embodiments, the raw pressure data may be associated with a specific sampling rate at which the data was recorded, as determined by the source from which the data originated, such as one of blast sensors 204, 206, and 208. For example, in such embodiments, the raw pressure data may be provided at a sampling rate of 100 kHz. In some embodiments, a specific sampling rate may be desirable to perform processing on the raw pressure data. Accordingly, in some embodiments, a sampling rate of 100 kHz may be preferred and if the set of blast exposure data is not sampled at 100 kHz the data may be either down-sampled to decrease the sampling rate or up-sampled to increase the sampling rate by linear interpolation to achieve a sampling rate of 100 kHz.

Further, in some embodiments, the raw pressure data may be associated with a duration window. The duration window defines a period of time for which the raw pressure data was recorded. Accordingly, the duration window may be selected to fit a typical duration of a blast. For example, if a blast is known to last no more than 1 second the duration window may be set to 1.5 seconds to ensure that the blast is captured within the duration window. It should be understood that the duration window is not limited to the time durations described herein and may be larger or smaller.

The processor 306 is configured to receive and process the blast exposure data 304 and identify false positive data 308 from the set of blast exposure data 304. The false positive data 308 may be flagged and removed from the set of blast exposure data 304 leaving non-rejected data 310. In some embodiments, the processor 306 is a processor on a computing device, such as a personal desktop computer, a laptop, a mobile device, or other suitable computing device known to include a processor. In some embodiments, the processor 306 may be included as a component of the plurality of blast sensors. Alternatively, in some embodiments, the processor 306 is included on a computing device that is remote from the plurality of blast sensors. In such embodiments, the blast exposure data 304 may be transmitted to the processor 306 over the internet via a wired or wireless connection, or using a removable storage device. For example, in some embodiments, the blast exposure data 304 may be stored in a removable storage device such as a USB flash drive or other suitable removable storage device. Here, the storage device may be removed to upload the blast exposure data 304 onto a computing device in which the processor 306 resides.

It should be understood that the components of FIG. 3 may be associated with various components of FIG. 1. For example, the processor 306 may be the CPU 106 of computer 102 which may communicate with the data source 302 over the internet 132 or local network 126. Similarly, the data source 302 may be data store 130 or local storage 122.

Figure 4:
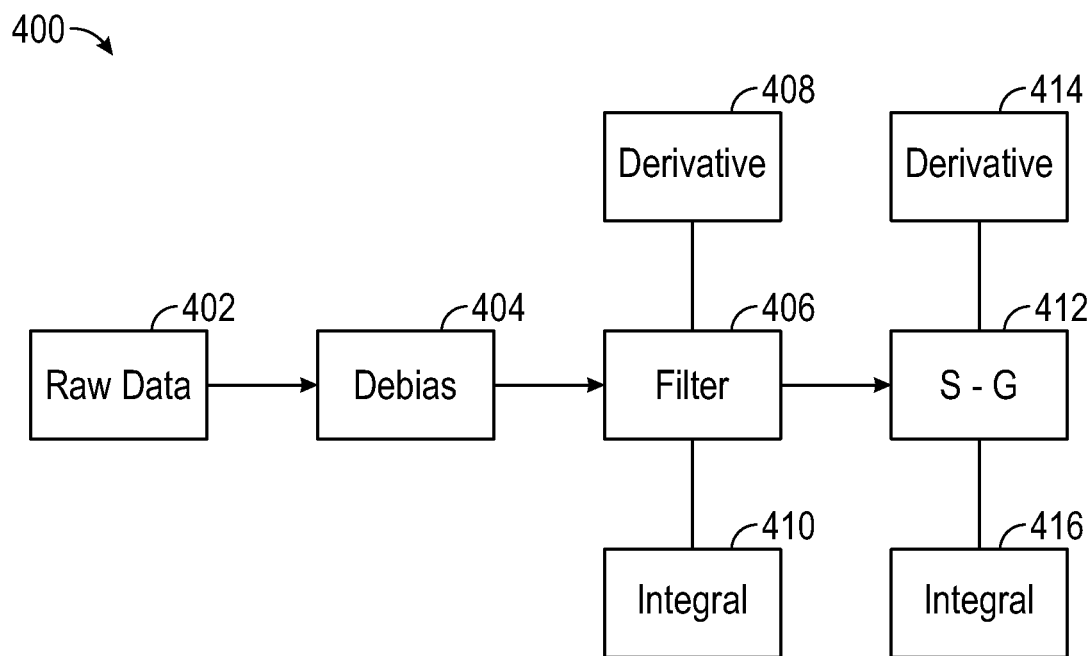
FIG. 4 shows a false positive data identification process for some embodiments of the invention.

Turning now to FIG. 4, a false positive data identification process for some embodiments is depicted and referred to generally by reference numeral 400. Such a process 400 may be carried out at the processor 306 of FIG. 3, in some embodiments. At block 402 raw pressure data is received. At block 404 the raw pressure data is debiased by subtracting a bias associated with the raw pressure data. At block 406 the debiased data is filtered to produce filtered data. Here, the data may be filtered using a filter such as a Butterworth filter or another suitable filter. A derivative is taken from the filtered data at block 408 and an integral is taken from the filtered data at block 410. At block 412 a Savitzky-Golay filter is applied to the filtered data from block 406 to remove noise from the data. A derivative is taken from the Savitzky-Golay data at block 414 and an integral is taken from the Savitzky-Golay data at block 416. It should be understood that various other components may be added to the process 400. For example, in some embodiments, a normalization block may be included where the data is normalized based on a peak overpressure from the Savitzky-Golay data.

Figure 5:
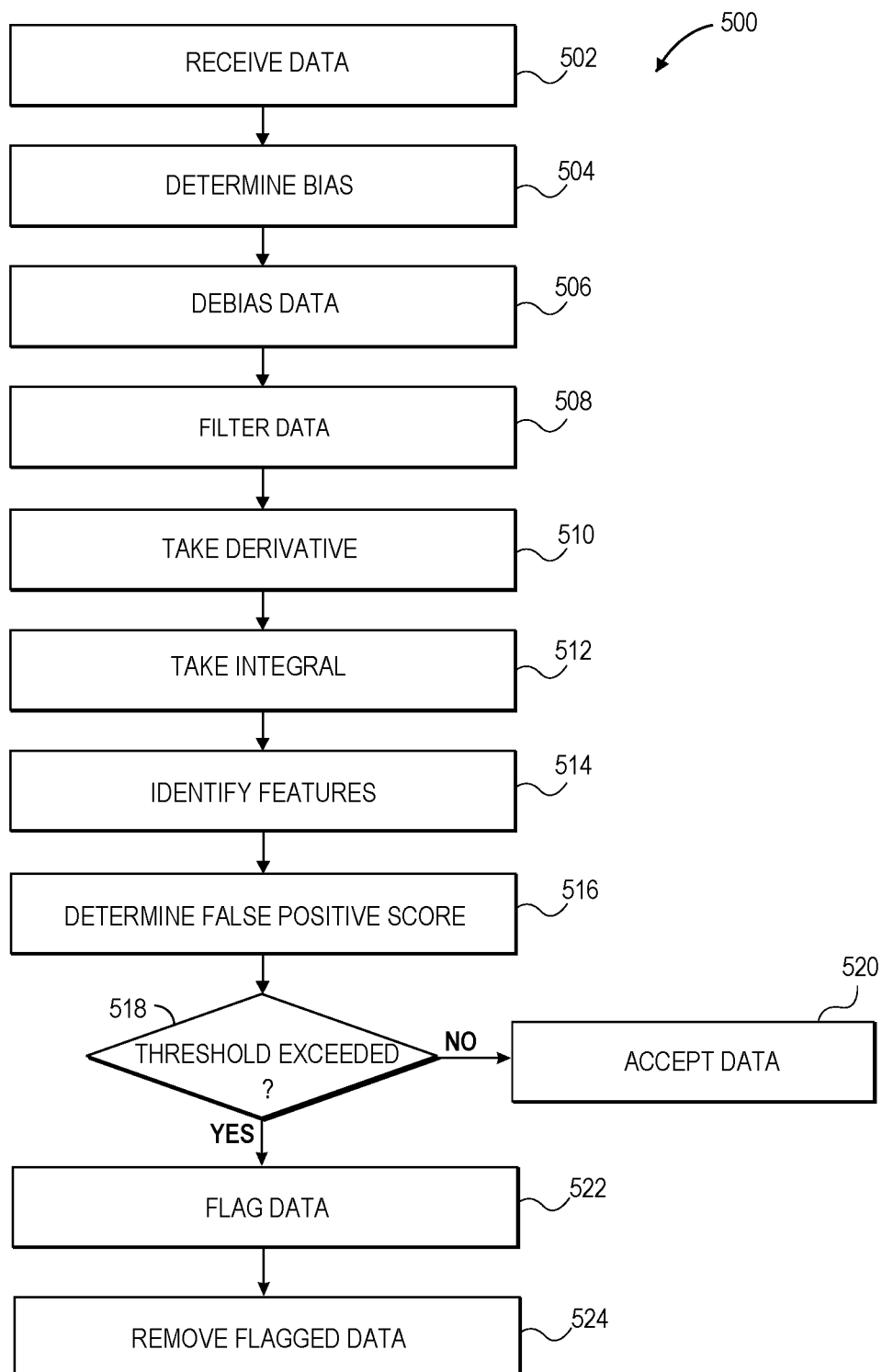
FIG. 5 shows a method for identifying false positive data relating to some embodiments of the invention.

Turning now to FIG. 5, a method for identifying false positive data relating to some embodiments is depicted and referred to generally by reference numeral 500. It should be understood that, in some embodiments, at least a portion of the steps of method 500 may be carried out by a processor, such as processor 306, as shown in FIG. 3. At step 502 a set of blast exposure data is received. The blast exposure data comprises raw pressure data. Here, the blast exposure data may be received from the data source 302. At step 504, a bias associated with the raw pressure data is determined. In some embodiments, the bias may be determined by averaging a first portion of a waveform within the raw pressure data, where the first portion occurs at the beginning of the waveform. Alternatively, the bias may be determined by averaging a second portion of the waveform, which occurs at the end of the waveform. Further, in some embodiments, the bias may be determined by averaging both the first portion and the second portion.

At step 506 the raw pressure data is debiased. In some embodiments, the data may be debiased by subtracting the bias determined at step 504 from the raw pressure data to remove the bias from the data. In some embodiments, the bias may be introduced into the data due to a variety of factors, for example, sensor drift and external factors. In many cases, the exact source of the bias may not be known still the bias is removed to produce unbiased data.

At step 508 the unbiased data is filtered to remove noise and smooth the data. Here, the step of filtering the data may include a Butterworth filter, a Savitzky-Golay filter, or another suitable filtering technique, as well as combinations thereof. For example, in some embodiments, the unbiased data is first filtered using a Butterworth filter and filtered again using a Savitzky-Golay filter. The Savitzky-Golay filter fits a plurality of polynomial functions to respective regions of adjacent data points within the data. The Savitzky-Golay filter is desirable to increase the precision of the data while maintaining the signal tendency and also to remove high frequency noise from the signal. Alternatively or in addition, the unbiased data may be normalized to a maximum pressure value present in the data. This may enable the standardized evaluation of features such as time-to-maximum pressure. In some embodiments, filters may be applied in succession or in parallel to obtain various data sets for feature detection.

At step 510 a derivative is taken from the filtered data. Here, the derivative may be taken with respect to time. For example, if the filtered data contains data of pressure over time, then the derivative will yield data as the rate of change of the pressure over time. At step 512 an integral is taken from the filtered data. Similarly, the integral may be taken with respect to time. For example, if the filtered data contains data of pressure over time, then the integration will yield impulse data over time. Either of the integration and derivative may be desirable for identifying certain features within the data.

At step 514 one or more predefined features are identified within the data. Such features may be identified within any of the data sets described herein, such as, for example, the set of blast exposure data, the raw pressure data, the debiased pressure data, the filtered data, the derivative data, and the impulse data. Such features may include but are not limited to baseline shift, maximum pressure, minimum pressure, median pressure, maximum impulse, minimum impulse, median impulse, a head to tail difference value, a convolution of pressure with a step function, flatness at a head of a pressure trace, and a large section of relatively flat pressure in a middle of the pressure trace. Each of the features may be predefined into an executable program implemented on the processor 306. In some embodiments, features that may be identified further includes features associated with specific types of waveforms. For example, features to identify a sine wave within the set of blast exposure data (such as might be produced by AC noise in the data) are contemplated.

In some embodiments, the step 514 of identifying the features may be carried out according to a human-generated feature detection algorithm executed by the processor 306. In such embodiments, the human-generated feature detection algorithm may be preloaded with features associated with false positive data. In some cases, the features may be identified by testing a plurality of parameters within the data. For example, in one embodiment, a feature may be associated with a maximum impulse value. Here, the maximum impulse value is retrieved from the impulse data and tested against a maximum impulse parameter threshold. By comparing the maximum value from the data with the parameter threshold it is determined whether a given feature is present. Further, in some embodiments, identifying the feature may not be a simple Boolean check to a threshold parameter, but may relative to the comparison of the values. For example, if a tested data value widely exceeds a parameter threshold this may be a strong indication that a feature is present and that the data is false positive data.

In some embodiments, it should be understood that new features may be added and that parameter thresholds may be adjusted according to user input. For example, in one embodiments, a graphical user interface may be presented to the user to allow the user to adjust parameter threshold values and add new features. In some embodiments, user input may be received through computer integrated peripherals, such as keyboard 118 and mouse 120, as shown in FIG. 1, or from another suitable input device.

In some embodiments, each of the features is associated with at least one of a plurality of predefined false positive classes. The false positive classes may be associated with common sources of false positive data within blast exposure data, such as, for example, electrical interference, thermal noise, or sensor degradation. In some embodiments, each false positive class may be associated with a plurality of the predefined features. In some embodiments, one or more of the plurality false positive classes may be associated with signal occurrences in the data that represent physical impossibilities. For example, signal occurrences such as a sawtooth, a plateau, and a sine wave may be deemed physically impossible. For example, certain signal features may be physically inconsistent with actual exposure to a blast. Therefore, features that are associated with these physically impossible signal occurrences may be indicative of false positive data. Further, the false positive classes may be associated with common signal interference, signal noise, and sensor errors. Accordingly, in some embodiments, the plurality of false positive classes comprises a noise class, a physical impossibility class, and a sensor error class.

In some embodiments, a feature may be included relating to a negative impulse at the beginning of a waveform within the set of blast exposure data. Such a negative impulse at the beginning of the waveform may be deemed a physical impossibility and therefore may be indicative of false positive data. Said feature may be associated with the physical impossibility class of false positive data.

At step 516 a false positive score is determined based on the one or more predefined features identified within the data. In some embodiments, each of the features is associated with a respective weight in determining the false positive score. Here, the weight is associated with the significance of the factor and determines the effect the factor has in calculating the false positive score. Similarly, weights may be associated with combinations of factors. For example, in some embodiments, a weight value may be associated with a value of a first factor multiplied by a second factor. Additionally, weights may be varied according to the relationship of a specific parameter with a respective parameter threshold. For example, if a maximum impulse parameter greatly exceeds a maximum impulse parameter threshold the weight associated with this parameter and an associated feature may be increased.

In some embodiments, the false positive score may be determined using an accumulator which is incremented when a feature or a combination of features exceeds a respective threshold. After the features have been processed the accumulator is compared to an accumulator threshold and if the accumulator exceeds the accumulator threshold, the data is flagged. For example, in one embodiment, the accumulator threshold is three. Accordingly, if the respective thresholds for more than three features are exceeded then the data is flagged.

At step 518 the determined false positive score is compared to a predetermined threshold score value to determine whether the threshold score value is exceeded. If the threshold score value is not exceeded the data is accepted at step 520 and deemed not to contain false positive information. Therefore, the data at step 520 is not rejected. If the threshold score value is exceeded, at least a portion of the data is flagged at step 522. Here, the data is deemed to contain false positive information and may be rejected. In some embodiments, step 522 involves associating a false positive flag with at least a portion of the set of blast exposure data. For example, in some embodiments, the false positive flag may be stored with the set of blast exposure data as meta data. At step 524 the flagged data is removed. In some embodiments, step 524 may be performed at the processor 306. Alternatively, in some embodiments, step 524 may be carried out by a human-operator reviewing the flagged data. Here, the human-operator may be a trained professional with experience identifying false positive data within blast exposure data.

It should be understood that, in some embodiments, step 522 of flagging the data may be skipped and instead the data that exceeds the false positive score threshold may be automatically removed from the set of blast exposure data. It should also be understood that various steps of method 500 may be repeated or performed in a different order or simultaneously. For example, in some embodiments, the step 508 of filtering the data may be performed more than once, first using a Butterworth filter to filter the debiased data, and second using a Savitzky-Golay filter to filter the already filtered data. Alternatively, the operations of taking a derivative or integrating the data may be repeated to detect additional features. For example, certain features may be present in filtered second derivative data.

After the method 500, the remaining accepted data may be used for various applications such as being introduced to a medical record of a user who experienced the blast exposure, determining an incident pressure associated with the blast exposure, and being stored in a data store for later use or statistical analysis.

An exemplary operation of method 500 will now be described. Here, for the sake of the example, it is assumed that the subject is subject 202, of FIG. 2. Similarly, the blast is blast 210. Accordingly, a blast exposure from blast 210 is experienced by subject 202 and recorded by blast sensors 204, 206, and 208. The blast exposure data 302 including raw pressure data from the blast sensors is then received by processor 306 at step 502.

Next at step 504 a bias is determined based on the blast exposure data. Here, the bias is determined by averaging a first beginning portion of a waveform within the raw pressure data. At step 506 the determined bias is subtracted from the raw pressure data to produce debiased pressure data. Here, the pressure data may be given as a pressure-time array such that the bias is subtracted from each of a plurality of data points within the raw pressure data.

Continuing the exemplary operation, the debiased pressure data is filtered using a Butterworth filter and filtered again using a Savitzky-Golay filter at step 508 to smooth the data and remove high frequency noise from the data. Here, various parameters may be identified and recorded within the data. For example, a peak overpressure may be identified within the data output from the Savitzky-Golay filter. At step 510 a derivative is taken from the filtered data from the Butterworth filter and another derivative is taken from the re-filtered data from the Savitzky-Golay filter. Similarly, at step 512 an integral is taken from the filtered data from the Butterworth filter and another integral is taken from the re-filtered data from the Savitzky-Golay filter. Various other parameters may be taken from the derived and integrated data, such as, for example, maximum values, minimum values, and other suitable parameters that may be indicative of false positive data.

At step 514 one or more features are identified within the data. It should be understood that the features may be identified in any of the raw pressure data, the debiased pressure data, the filtered data, the derived data, and the integrated data. For the sake of the example, the identified feature is indicative of a sine wave within the filtered data oscillating at a frequency of around 60 Hz. Accordingly, the identified feature belongs to an electrical interference false positive class. At step 516 the false positive score is determined to be high because the sine wave is detected within the data. Accordingly, at step 518 the threshold false positive score is exceeded and the portion of the data including the sine wave is flagged at step 522. After flagging the portion of the data, the flagged data is removed from the set of blast exposure data at step 524. In some embodiments, the removed data may be stored in a false positive data store as a future example of false positive data.

In some embodiments, a machine learning algorithm, such as an artificial neural network algorithm may be implemented to identify false positive data and features associated with false positive data. Here, the machine learning algorithm may be executed on the processor 306 and may be trained using historic false positive data received from a historic blast exposure data store or a plurality of data stores storing historic blast exposure data. In some embodiments, the machine learning algorithm may be trained using false positive data from the human-generated feature detection algorithm, as discussed above. Accordingly, the machine learning algorithm may accurately identify false positive data within the set of blast exposure data. The accuracy of the machine learning algorithm may further improve over time with each data set fed through the machine learning algorithm. In some embodiments, it may be desirable to include the machine learning algorithm, such that new types of interference and false positive classes may be identified. In such embodiments, the machine learning algorithm may be retrained to identify new types of interference and false positive data, such that the machine learning algorithm adapts to different types of data interference and new occurrences within blast exposure data.

In some embodiments, a source identification machine learning algorithm may also be used to identify different types and sources of blast exposure data. For example, in such embodiments, the source identification machine learning algorithm may be employed to identify the type of weapon from which a blast originated from by analyzing the set of blast exposure data. Here, the source identification machine learning algorithm is trained with blast exposure data from various sources, such that similar blasts from similar sources may be identified. In some such embodiments, the source identification machine learning algorithm may be a component of the machine learning algorithm described above or a separate algorithm.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of identifying false positive data from a set of blast exposure data using at least one processor of a user device, the method comprising:
    receiving, at the user device, the set of blast exposure data comprising raw pressure data over time collected by one or more blast sensors configured to detect blast pressure data associated with a blast exposure;
    determining a bias associated with the raw pressure data;
    debiasing the raw pressure data according to the bias to produce debiased pressure data;
    identifying, by the at least one processor, one or more features of a plurality of predefined features within the debiased pressure data,
    wherein the one or more features of the plurality of predefined features are associated with one or more predefined false positive classes; and
    flagging at least a portion of the set of blast exposure data based on the one or more features of the plurality of predefined features.

2. The method of claim 1, further comprising filtering the debiased pressure data to produce filtered pressure data.

3. The method of claim 2, further comprising:
    integrating the debiased pressure data over time to produce impulse data; and
    integrating the filtered pressure data over time to produce filtered impulse data.

4. The method of claim 1, wherein the one or more predefined false positive classes comprises a noise class.

5. The method of claim 1, wherein the one or more predefined false positive classes comprises a sensor error class.

6. The method of claim 1, wherein the one or more predefined false positive classes comprises a physical impossibility class.

7. The method of claim 6, further comprising:
    identifying, within the set of blast exposure data, a negative impulse associated with the physical impossibility class; and
    removing at least an additional portion of the set of blast exposure data relating to the negative impulse.

8. One or more non-transitory computer-readable media storing computer-executable instructions that, when executed by at least one processor, perform a method of identifying false positive data from a set of blast exposure data, the method comprising:
    receiving the set of blast exposure data comprising raw pressure data over time collected by one or more blast sensors configured to detect blast pressure data associated with a blast exposure;
    determining a bias associated with the raw pressure data;
    debiasing the raw pressure data according to the bias to produce debiased pressure data;
    filtering the debiased pressure data to produce filtered pressure data;
    identifying one or more features of a plurality of predefined features within any of the raw pressure data, the debiased pressure data, pressure change data, the filtered pressure data, and filtered pressure change data,
    wherein the one or more features of the plurality of predefined features are associated with one or more predefined false positive classes; and
    flagging at least a portion of the set of blast exposure data based on the one or more features of the plurality of predefined features.

9. The one or more non-transitory computer-readable media of claim 8, the method further comprising:
    determining a false positive score associated with the set of blast exposure data based on the one or more features of the plurality of predefined features.

10. The one or more non-transitory computer-readable media of claim 9, the method further comprising:
    automatically removing at least an additional portion of the set of blast exposure data based on the false positive score.

11. The one or more non-transitory computer-readable media of claim 8, wherein the plurality of predefined features comprises:
    a maximum impulse value feature;
    a head to tail difference value feature;
    a maximum pressure value feature; and
    a baseline-shift feature.

12. The one or more non-transitory computer-readable media of claim 8, wherein the plurality of predefined features comprises:
    a sawtooth signal feature;
    a plateau signal feature; and
    a sine wave signal feature.

13. The one or more non-transitory computer-readable media of claim 8, wherein the plurality of predefined features comprises a feature associated with a section of substantially flat pressure within the set of blast exposure data.

14. A system comprising:
one or more body-mounted blast sensors operable to detect blast pressure data associated with a blast exposure; and
at least one processor programmed to perform a method of identifying false positive data from a set of blast exposure data, the method comprising:
   receiving the set of blast exposure data comprising raw pressure data over time from the one or more body-mounted blast sensors;
   determining a bias associated with the raw pressure data;
   debiasing the raw pressure data according to the bias to produce debiased pressure data;
   identifying one or more features within the debiased pressure data,
   wherein the one or more features are associated with one or more predefined false positive classes;
   determining a false positive score associated with the set of blast exposure data based on the one or more features; and
   if the false positive score exceeds a predetermined threshold value, flagging the set of blast exposure data.

15. The system of claim 14, the method further comprising filtering the debiased pressure data to produce filtered pressure data.

16. The system of claim 15, wherein the debiased pressure data is filtered using a Savitzky-Golay filter.

17. The system of claim 14, wherein the one or more body-mounted blast sensors include:
   a head-mounted blast sensor;
   a shoulder-mounted blast sensor; and
   a chest-mounted blast sensor.

18. The system of claim 14, further comprising:
   a machine learning model trained to identify false positive data within the set of blast exposure data.

19. The system of claim 14, the method further comprising:
   identifying a peak overpressure within the set of blast exposure data.

20. The system of claim 19, the method further comprising:
   normalizing the raw pressure data based on the peak overpressure.

* * * * *